US012197523B2

(12) United States Patent
Lawson et al.

(10) Patent No.: US 12,197,523 B2
(45) Date of Patent: *Jan. 14, 2025

(54) MATCHING WEB ELEMENTS BETWEEN DIFFERENT VERSIONS OF WEBSITES

(71) Applicant: LOU Web Technologies Inc., Austin, TX (US)

(72) Inventors: Kyle Lawson, Austin, TX (US); Rachel Pardue, Austin, TX (US)

(73) Assignee: LOU Web Technologies Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,407

(22) Filed: Jun. 10, 2022

(65) Prior Publication Data
US 2022/0300566 A1    Sep. 22, 2022

Related U.S. Application Data

(63) Continuation of application No. 16/813,625, filed on Mar. 9, 2020, now Pat. No. 11,372,944.

(60) Provisional application No. 62/815,637, filed on Mar. 8, 2019.

(51) Int. Cl.
| | | |
|---|---|---|
| G06F 17/00 | (2019.01) | |
| G06F 16/954 | (2019.01) | |
| G06F 16/957 | (2019.01) | |
| G06F 16/958 | (2019.01) | |
| G06F 9/451 | (2018.01) | |

(52) U.S. Cl.
CPC ........ *G06F 16/954* (2019.01); *G06F 16/9577* (2019.01); *G06F 16/958* (2019.01); *G06F 9/453* (2018.02)

(58) Field of Classification Search
None
See application file for complete search history.

(56) References Cited

U.S. PATENT DOCUMENTS

| | | | |
|---|---|---|---|
| 11,372,944 B2 | 6/2022 | Lawson et al. | |
| 2004/0044635 A1 | 3/2004 | Gordon et al. | |
| 2009/0172534 A1* | 7/2009 | Budreau | G06F 9/453 |
| | | | 715/704 |
| 2017/0269945 A1* | 9/2017 | Patel | G06F 9/453 |
| 2020/0133643 A1* | 4/2020 | Hou | G06F 9/451 |

\* cited by examiner

*Primary Examiner* — Thanh T Vu
(74) *Attorney, Agent, or Firm* — Hamilton, Brook, Smith & Reynolds, P.C.

(57) ABSTRACT

Online tutorials for websites or software platforms can become out of date quickly once a website or platform has a minor update. Embodiments of the present invention fix this problem by automatically mapping website elements from the original tutorial to elements of the updated website by calculating and determining similar non-exact matches to those elements as the website changes. This gives designers of websites flexibility to perform maintenance and updates to their websites without regularly reprogramming their tutorials ensuring a higher accuracy of educational material for the end-user.

20 Claims, 8 Drawing Sheets

MATCHING WEB ELEMENTS BETWEEN DIFFERENT VERSIONS OF WEBSITES

RELATED APPLICATIONS

This application is a continuation of U.S. application Ser. No. 16/813,625, filed Mar. 9, 2020, and issued as U.S. Pat. No. 11,372,944 on Jun. 28, 2022, which claims the benefit of U.S. Provisional Application No. 62/815,637, filed on Mar. 8, 2019. The entire teachings of the above applications are incorporated herein by reference.

BACKGROUND

Interactive tutorials, often referred to as "product tours" within "digital adoption platforms," can take the form of web widgets that overlay onto existing software platforms or websites. An interactive tutorial's primary purpose is to educate user(s) (e.g., the visitor(s) of the platform or website who the platform or website is designed to serve) about the platform or website by guiding users through how to complete different tasks within the platform or website. Interactive tutorials accomplish this interactive method of teaching and guidance by indicating which website elements the user should interact with (e.g., click, select, touch, drag-and drop, enter a specific text, or other user interaction techniques).

SUMMARY

In an embodiment, a method includes building a tutorial for an end-user of a website by selecting and adding, to the tutorial, at least one original element of the website to be highlighted to the end-user and storing (a) attributes of the at least one original element and (b) one or more relationships of the at least one original element to other elements of the website in a database. The method further includes retrieving a list of derivative elements from a modified website. The method further includes updating the tutorial of the website for each particular original element of the at least one original elements added to the tutorial by generating a similarity metric by comparing the stored attributes of the particular original element and the stored one or more relationships of the particular original element to attributes of each of the derivative elements of the modified website and one or more relationships of the derivative elements of the modified website, selecting a derivative element of the list of elements having a highest similarity metric as matching the particular original element of the tutorial, and updating the tutorial by mapping the derivative element having the highest similarity metric to the particular original element of the tutorial.

A person having ordinary skill in the art can recognize that a derivative element is an element of the modified website that may or may not have changed compared to the original website. The original element is an element of the website before it is modified.

In an embodiment, building the tutorial further includes warning the end-user upon determining that the at least one element of the website is invalid for inclusion in a tutorial.

In an embodiment, selecting the element having the highest similarity metric further includes, if at least one element of the modified website has a similar type attribute to the at least one element of the website, scoring each of the at least one elements with the similar type attribute by comparing the attributes of the at least one element of the website to the at least one element of the modified website.

In a further embodiment, if an element is not selected or is selected but a higher scoring element has been found, the method selects a highest scoring element and waits for changes to the website. If an element is selected and the highest scoring element does not have a higher score than the currently selected element, the method waits for website changes.

In an embodiment, the similarity metric is a determination of similarity of the element and its attributes. The similarity metric can include the score of the elements.

In an embodiment, the method further includes when an element with a similar type attribute is not found, determining whether any elements of the website have the same class attributes as elements of the modified website. If so, the method scores each of the at least one elements with the same class attribute by comparing the attributes of the at least one element of the website to the at least one element of the modified website. Otherwise, the method selecting all elements that are valid tutorial elements, and scores each of the at least one elements that are valid tutorial elements by comparing the attributes of the at least one element of the website to the at least one element of the modified website.

In an embodiment, the method further includes, for elements viewed multiple times, determining an importance metric for each original element attribute of the at least one original element of the website. If all original element attributes having an importance metric above a low threshold match the corresponding derivative element attributes, creating a data object of the corresponding derivative element attributes matching and not matching the at least one original element of the website. If only original element attributes having an importance metric above a high threshold do not match the corresponding derivative element attributes, or if only original element attributes having an importance metric below a high threshold and above a low threshold do not match the corresponding derivative element attributes determining whether non-matching attributes have matched in other recent step views stored in a database, and if so, marking the step as having a high likelihood of having been changed, and otherwise, creating a data object of element derivative attributes matching and not matching the at least one original element of the website. If original element attributes having an importance metric that are below the low threshold do not match the corresponding derivative element attributes, the method determines that the step is likely unchanged. In an embodiment, the method includes creating a data object for each of a set of highest scoring elements having a score, rank, and a Boolean match value within each respective data object. The method further includes storing the data object in a database each time a tutorial step is executed. The method further includes analyzing the data objects to determine elements having a strongest influence on selecting a correct element. The method further includes adjusting scoring weights of each element attribute based on said analysis.

In an embodiment, a system includes a processor and a memory with computer code instructions stored thereon. The processor and the memory, with the computer code instructions, are configured to cause the system to build a tutorial for an end-user of a website by selecting and adding, to the tutorial, at least one original element of the website to be highlighted to the end-user and storing (a) attributes of the at least one original element and (b) one or more relationships of the at least one original element to other elements of the website in a database. The instructions further cause the processor to retrieve a list of derivative elements from a modified website. The instructions further cause the processor to update the tutorial of the website for each particular element of the at least one original element added to the tutorial by generating a similarity metric by comparing the stored attributes of the particular original element and the stored one or more relationships of the particular original element to attributes of each of the derivative elements of the modified website and one or more relationships of the derivative elements of the modified website, selecting a derivative element of the list of elements having a highest similarity metric as matching the particular original element of the tutorial, and updating the tutorial by mapping the derivative element having the highest similarity metric to the particular original element of the tutorial.

In an embodiment, a method includes updating a tutorial of an original website for each particular original element the original website added to the tutorial by generating a similarity metric by comparing attributes of the particular element of the original website and one or more relationships of the particular original element of the original website to attributes of each derivative element of a modified website and one or more relationships of the derivative elements of the modified website, selecting a derivative element having a highest similarity metric as matching the particular original element of the tutorial, and updating the tutorial by mapping the derivative element having the highest similarity metric to the particular original element of the tutorial.

In most instances, the company that owns the software platform or website assigns their internal team to create and manage these interactive tutorials via a 3$^{rd}$ party service (e.g., a "digital adoption platform"). Many software platforms and websites such as Customer Relationship Management systems, financial services software, etc. make frequent changes or updates to their software platform or website. Altering the platform can cause interactive tutorials to break (e.g., point to incorrect website elements, render incorrectly on the hypertext markup language (HTML) document object model (DOM), display incorrect or outdated content, etc.) and can compromise the platform or website as a whole. In addition, once the platform is altered, the corresponding tutorials (e.g. tutorials that include elements that have been changed or moved, tutorials that provide guidance on subject matter that has been altered, or subsequent workflows that no longer exist) must be updated to reflect the platform or website changes in both content and user interface design or be deleted due to lack of accuracy. For this reason, currently maintaining interactive tutorials or digital adoption platforms is time consuming, costly, and leads to incorrect educational material for users and malfunctioning software for companies. It would be advantageous for interactive tutorials to automatically adapt and update as the corresponding elements or content of a website or platform is changed.

The present invention advantageously fulfils the aforementioned deficiencies by enabling interactive tutorials to automatically update to reflect changes in the website or platform so that maintaining digital adoption platforms is no longer a time consuming, expensive, and manual undertaking. It also ensures higher accuracy of correct educational material for the end-user. In an embodiment, the method includes building a tutorial for an end-user of a website by selecting and adding, to the tutorial, an element of the website to be brought to the attention (e.g. modified, pointed to, highlighted, enlarged, etc.) of the end-user. The method for building the tutorial so that it can detect and adapt to changes in its environment further includes storing (a) attributes of the at least one element and (b) one or more relationships of the at least one element to other elements of the website in a database. The method further includes retrieving a list of elements from a modified website and updating the tutorial for each particular element of at least one element added to the tutorial. Next, the method includes generating a similarity metric by comparing the stored attributes of the particular element and the relationships of the particular element to attributes of each of the elements of the modified website and relationships of the elements of the modified website. Updating the tutorial further includes selecting the element of the list of elements having a highest similarity metric as matching the particular element of the tutorial. Updating the tutorial further includes comparing the attributes of the selected element that contributed to the high similarity metric to a history of selected elements and the selected elements' attributes that contributed to the high similarity metrics. Updating the tutorial further includes determining whether or not the attributes of the selected element that contributed to the high similarity metric are different from the trajectory of the history of selected elements and the selected elements' attributes that contributed to the high similarity metrics. Updating the tutorial concludes by mapping the element having the highest similarity metric to the particular element of the tutorial if it is determined to be different from the trajectory of the history of selected element attributes.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
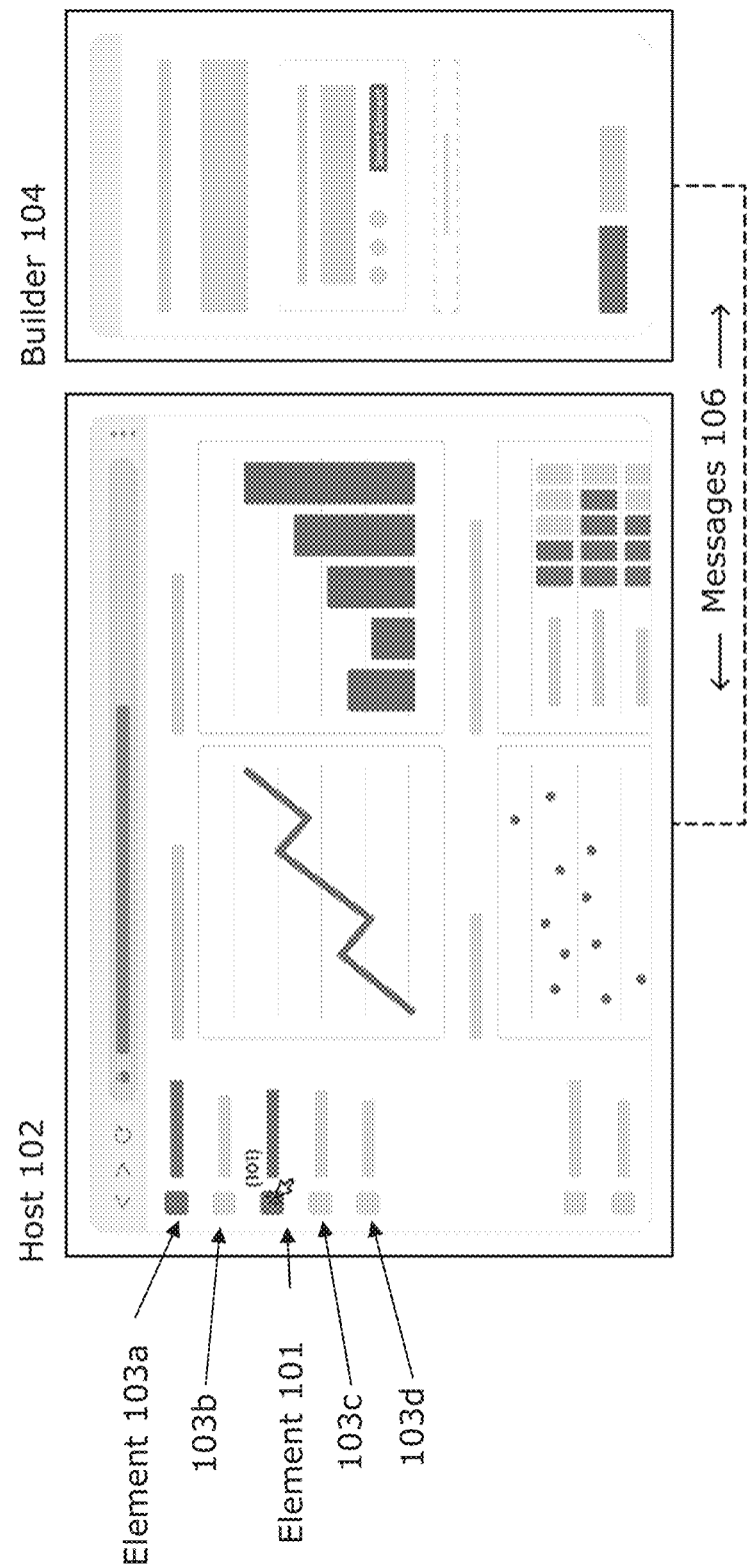
FIG. 1 is a diagram illustrating an example embodiment of a host and a builder of the present disclosure.

A description of example embodiments follows.

Currently, digital adoption platforms only have two ways to address this maintenance problem, and both have deficiencies. The first option is to only allow elements that hold a unique identifier, such as an id attribute, to be used in an interactive tutorial. However, when a website element is changed or moved to a different location, its unique identifier usually changes with it, which severely limits the types of tutorials that can be created. In addition, many modern website frameworks no longer rely on a unique identifier for every html element on the website. These modern websites re-determine unique identifiers each time a website is rendered and therefore tutorials can become inoperable because the unique identifiers are inconsistent for different users. Relying on one unique identifier for selecting an element is likely to lead to incorrect elements being selected when updates are made to a website. This is a common complaint from customers of existing digital adoption platforms.

The second option, is to force a website owner or administrator to add a special identifier tag to their website code for each element to be used in an interactive tutorial. This second option, while solving some of the problems raised by the first option, raises other problems. Implementation of this second option requires a development team to add the special identifier tag to each website HTML element. Further, these special identifier tags have to be confirmed to be accurate or manually modified when updating existing tutorials or creating new ones. This is a time consuming and labor-intensive process given the frequency of updates. In addition, customer relation/success teams that make the interactive tutorials are often unaware of updates that the website development team applied to the website, so controlling the accuracy of the interactive tutorials can become difficult or impossible to manage.

The solution described in the present disclosure is that instead of using one unique identifier or special identifier, the present element selection method analyzes (1) over 50 different element attributes that exist on every html element and (2) relationships determined between the target element and other elements on the website. A single attribute of an html element, on its own, is most likely not unique to the html element. Therefore, the proposed element selection method uses a combination of attributes of each html element as an identifier to drastically increase the scope and accuracy of automatic maintenance of interactive tutorials.

Therefore, Applicant's method records the element attributes of every html element on a webpage, and when the webpage is modified (e.g., for maintenance or upgrade), it analyzes the new upgraded webpage to correlate attributes of the html elements of the new webpage with attributes of the html elements of the old webpage.

While no one element attribute is completely unique to the target element, the element selection method analyzes multiple attributes or all attributes of an html element to generate an estimate of the website element to select. The estimate (e.g., a best guess) can be based on determining a probability distribution for each element on the website. The generated estimate can be the highest probability match between attributes and relationships of two html elements.

The process of determining the estimate of a web element to select has two stages. The first stage is calculating values for each element attribute that measure its significance factor in determining the correct target element, relative to other element attributes. This first stage is illustrated in more detail in relation to FIG. 6, which is further described below. These values can be calculated by running cluster and k-NN analysis on previous data from elements that have been selected on hundreds of other web platforms. These values can further be calculated on a per-website basis using previous data from elements that have only been selected on the web platform in question as to increase accuracy on websites that are built using different coding languages, frameworks, libraries, or architectures. These statistical methods determine relationships and patterns between variables and are perfect for calculating the significance of each element attribute. The present disclosure applies the cluster and k-NN analyses to gathering anonymized data of hundreds or more web platforms to determine significance of each web element. After determining significance factor weights (e.g., significance weights), the method proceeds to stage two.

Figure 4:
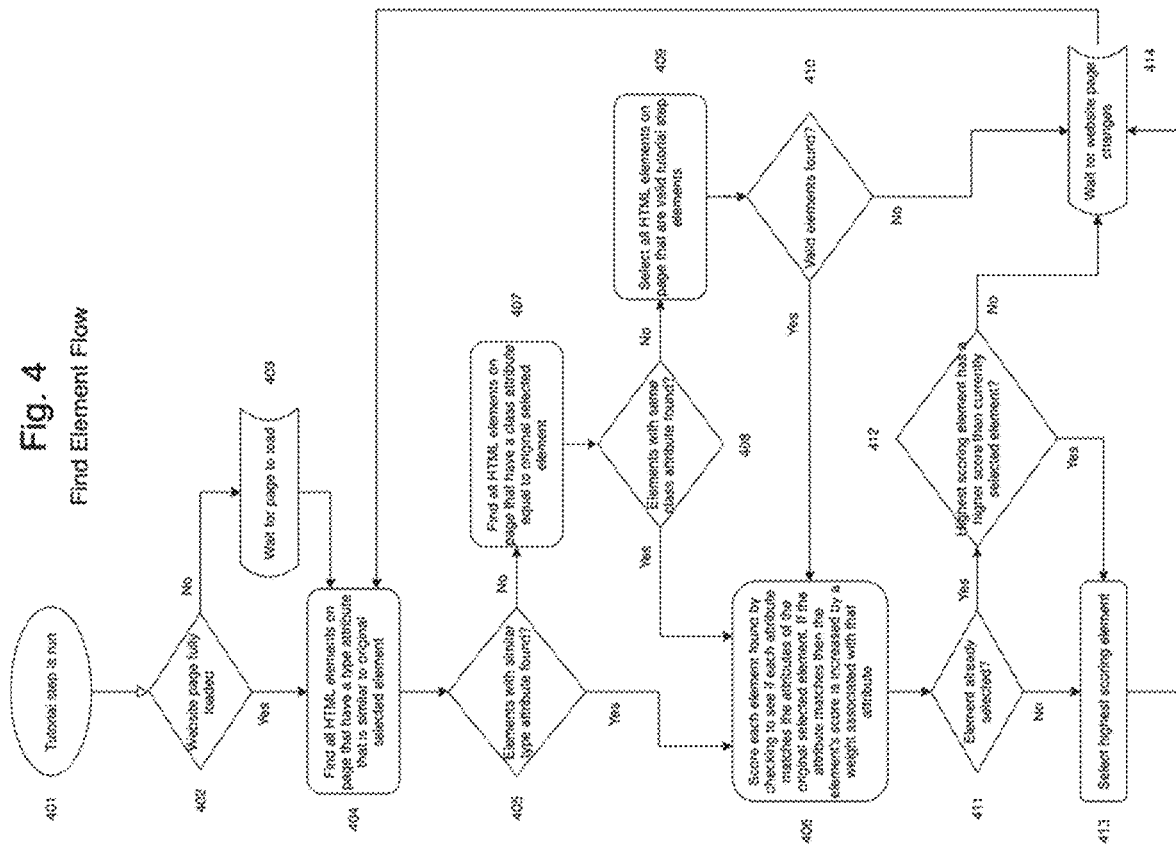
FIG. 4 is a flow diagram illustrating an example embodiment of a method employed by the present disclosure, finding an element.

In stage two of determining an estimate of a web element to select, the method retrieves a filtered list of possible target elements from the website by selecting elements that have the same commonly shared attribute as the target element such as classes, tag names, or CSS properties (FIG. 4). Next, the method scores each attribute of each element by comparing its similarity to the target element's attributes and considering the attributes significance weight. These attribute scores are totaled for each element and the element with the highest score/probability can be accepted as the target element. This scoring system is effective because when an element is updated, while some of its attributes change, many of its attributes remain the same. Therefore, the score of the original element remains higher than other possible elements, unless the element has been drastically updated. When supplied with a dataset of the history of selected elements from the tutorial step in question, the element selection method can determine if an element within a tutorial has been updated, or disappeared by considering (1) statistical analysis of average target element scores, (2) the common ranges between a target element's score and the next best element's score, and (3) the history of statistically significant attributes of the selected element. This allows the interactive tutorial of a website or platform to be automatically updated to reflect small changes to the element without manual maintenance because the method can find the element and update the tutorial to use the updated element.

With a drastic update to the website, however, the tutorial has most likely become irrelevant or outdated, and requires maintenance from the tutorial owner (e.g., generating a new tutorial for the drastically updated website). If changes are too drastic, the method can determine that one or more elements are missing, flag the tutorial as inoperable, and send a notification to a maintenance or other designated user to decrease the chances that an end-user is shown a broken tutorial (e.g., a tutorial that points to incorrect website elements, renders incorrectly on the HTML DOM, displays incorrect or outdated content, has missing tutorial steps, etc.). The designated user can either confirm that the tutorial is outdated and manually update it, or indicate where the element has moved to on the website. If the designated user reselects the updated element, that data is fed back into the method thus strengthening its ability to detect changes in the future by improving the existing dataset.

This process of determining an estimate of the correct element to select within a tutorial results in a significant advantage over the manual process required by other existing digital adoption platforms. In order to determine the correct element, the applicant's method uses non-obvious relationships between elements to increase the amount of available information about an element. The method also uses a non-obvious approach to data collection by creating a historical dataset of the seemingly useless selected elements and their attributes that are available every time a tutorial is run. By combining attributes, relationships, and historical data that would normally be written off as not containing enough weight to accurately select the correct element, the method takes a novel approach to sorting through the available data, ranking it by importance, and making a probabilistic estimate at finding the element that is most similar to the target element. With websites becoming increasingly dynamic and interactive, this non-obvious approach eliminates the current need for a 100% match between attributes and relationships between a target element and html elements on a page, thus allowing website owners and companies to use interactive tutorial technology while maintaining the flexibility to continuously update and improve their web and software platform.

Applicant's element selection method includes two phases. Herein, the first phase is referred to as the "Selection Phase" and the second phase is referred to as the "Retrieval Phase".

FIG. 1 illustrates an example embodiment of a host 102, a builder 104, and messages 106 exchanged between the host 102 and builder 104. The Selection Phase employs two main technologies: a host website 102, which can be owned or operated by any party, and a browser extension called the builder 104. The builder 104 and host 102 communicate with each other by sending messages 106 back and forth using a web browser's (e.g., Internet Explorer®, Mozilla Firefox®, Google Chrome®, etc.) messages API.

A client user, who operates and maintains the host website 102, uses the builder 104 to create interactive tutorials. The tutorials are one or more web widgets that guide a website user through a series of steps by indicating with which website elements the website user should interact. The builder 104 allows the client user to designate a website element 101, which is an individual component written in the HTML programming language comprised of a starting tag, closing tag, and attributes, for highlighting by the interactive tutorial to indicate that the website user should interact with that element 101. When the client user designates a website element, the host 102 sends all of the attributes associated with the element 101 to the builder 104. The Builder organizes the Element's attributes (e.g., 53 attributes) into a data object (e.g., using JSON, SQL, etc.). This process is outlined in FIG. 3 "Select Element Flow," which is described below in further detail below.

The builder 202 also processes the attributes of the element 101 and identifies added relationships between the element 101 and the website of the host 102. One example relationship is an xPath, which is essentially a node map of where the element 101 exists in relationship to other html elements 103a-d of the host 102. An xPath on its own does not identify the Element because when the website of the host 102 reacts to input from the website user, other html elements 103a-d of the host 102 website may be added or removed, causing the Element's xPath to change. This highlights the novelty, nonobviousness, and advantage of the present element selection method. Instead of relying on one unique identifier for the element 101, the present element selection method accounts for many attributes and relationships to make an estimate at identifying the element 101 when the website has updated.

Once the builder 104 receives an element 101 selection from the client user, the element's 101 attributes and relationships are serialized into a storable data object (e.g., JSON, SQL, etc.). The builder 104 posts this data object to an API server. The API server is configured to service multiple client users, while keeping each client's data private and distinct. When the API server receives the data object of the element's 101 attributes and relationships, the API server saves the data object to a database.

As the API server further receives data objects from multiple different hosts, it can employ statistical analysis to determine relationships between the types of attributes that are commonly found on different types of website elements, while keeping the privacy of the host's data intact by, for example, anonymizing the data before analysis and rejecting any personally identifiable information. The API uses these relationships to calculate weights for each element attribute that determine its significance factor relative to other element 103a-d attributes. This statistical analysis can either be performed on a combined dataset of elements from hundreds of different websites or on a dataset that only includes elements from the website in question. By performing statistical analysis on both datasets, the method can calculate more accurate significance factor weights for websites that use less common programming languages, frameworks, or architectures. The process for calculating these significance factor weights is outlined in FIG. 6. "Calculate Attribute Weights Flow".

Figure 2:
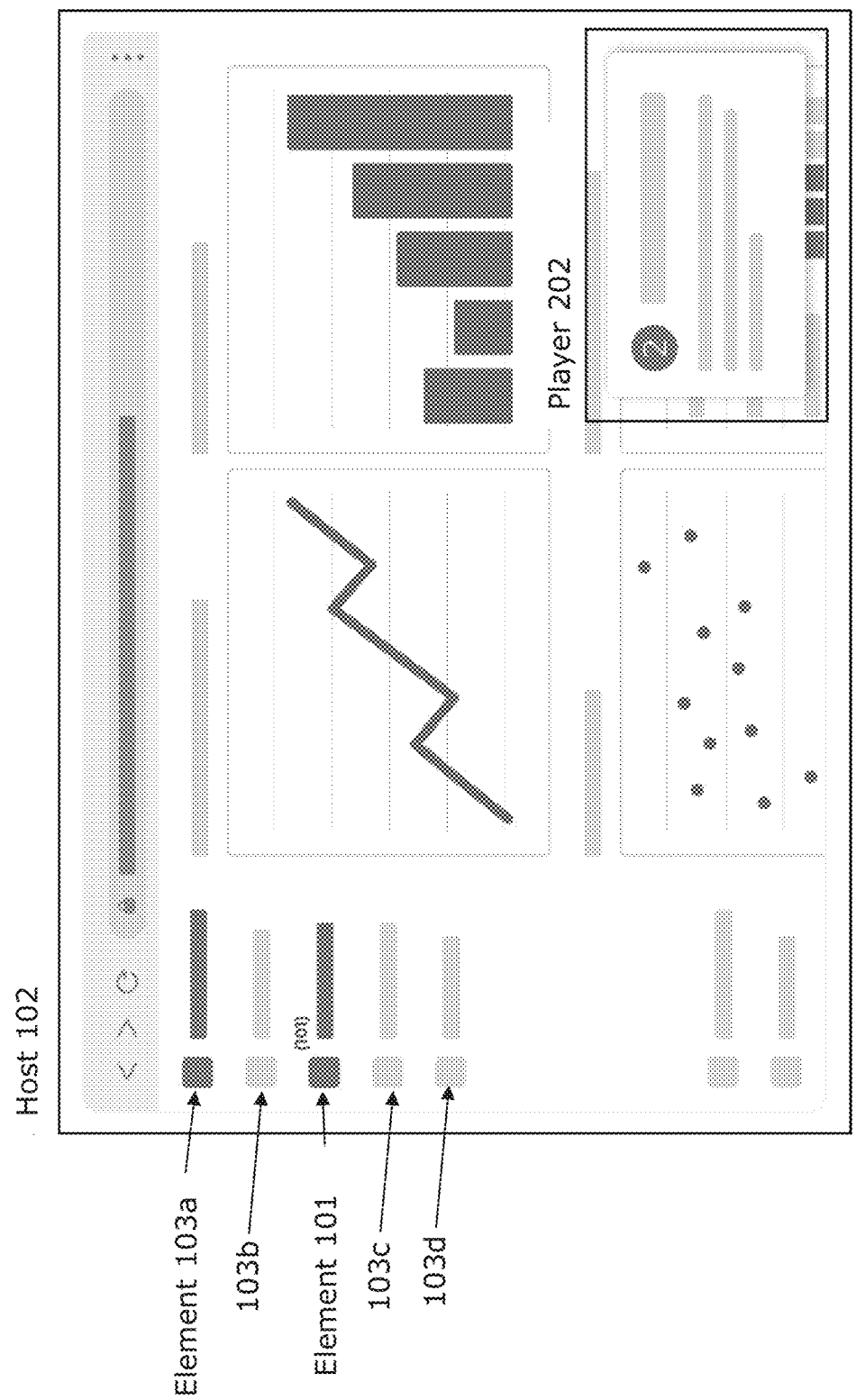
FIG. 2 is a diagram illustrating an example embodiment of a host and a player of the present disclosure.

FIG. 2 is a block diagram 200 illustrating an example embodiment of a host 102 and a player 202. The retrieval phase employs two main technologies: the host 102, from which the element 101 was originally selected, and a player 202 web widget, which is a module that is injected into the host 102 website but that is maintained separately from the host's 102 code. In an embodiment, the module can be implemented using JavaScript, but a person having ordinary skill in the art can recognize that other languages can be used. The player 202 can be injected into the host 102 in two ways. In the first way, the client user 102 of the host agrees to manually add a code snippet (e.g., a "script tag") of the player 202. The script tag retrieves a cloud hosted JavaScript file and delivers the file to the host 102. In the second way, a browser extension that is downloaded by a website user inserts or injects the script tag into the host 102, as long as this abides by the host's 102 website security policy.

The player 202 reacts to input from a website user. When a website user prompts the Player 202 to begin an interactive tutorial, the player 202 retrieves the element data object from the API for the designated interactive tutorial step. Depending upon the type of attributes in the element data object, the player 202 determines the best way to retrieve a filtered list of all the host's 102 html elements that are similar to the element. When the website page is fully loaded, the player 202 starts by retrieving all elements with a similar type or "tagName" attribute. If no elements are found containing similar type attributes then the player (e.g., element 202 of FIG. 2) attempts to retrieve all elements with a similar class. If again, no elements are found containing a similar class, then the player 202 proceeds to retrieve all elements that fit a certain criteria of attributes and are determined to be valid tutorial step elements. After extracting/receiving a list of html elements from the host 102, the player 202 analyzes and determines the similarity of each attribute of each html element to each attribute of the element data object. The player then determines a total score for each html element by combining the similarity factors for each attribute with the significance weight of each attribute and a total score. The html elements are then sorted by their score and a best estimate (a.k.a., a "winner html element") is chosen. This best estimate is the player's 202 determination of the highest probability match to the original Element on the host 102. If at any time, during this process, the website page updates or changes due to user interaction, the elements are retrieved again, and scores are re-calculated. Once completed, if the new highest scoring element is different from the old highest scoring element and the new highest scoring element received a higher score than the old highest scoring element then the new highest scoring element is selected as the "winner HTML element".

Figure 3:
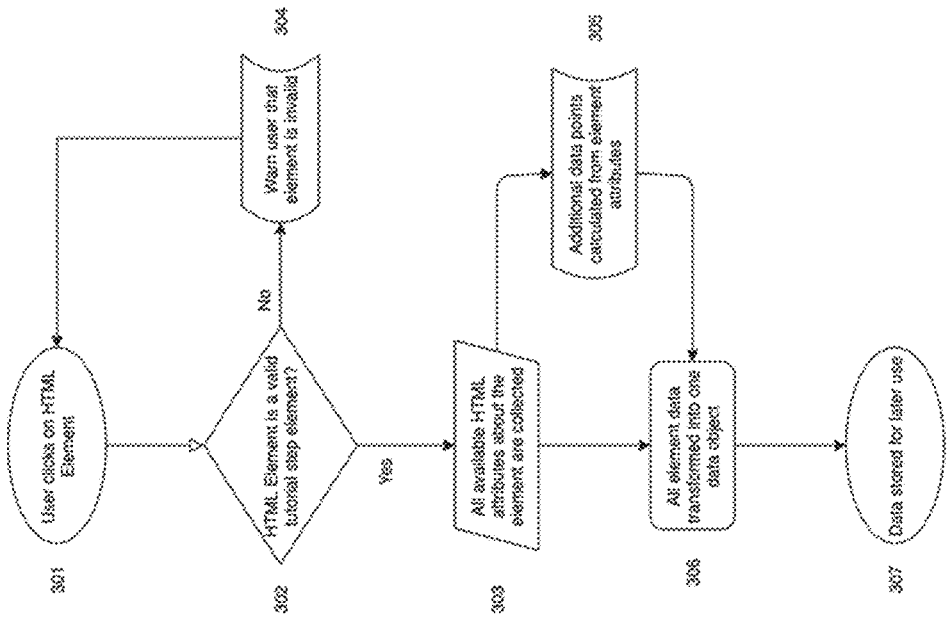
FIG. 3 is a flow diagram illustrating an example embodiment of a method for selecting an element employed by the present disclosure.

FIG. 3 is a flow diagram illustrating an example embodiment of a method employed by the present disclosure. The method begins by a client user (e.g., a tutorial designer) selecting an element on a website to highlight in an interactive tutorial (301). If the element is a valid tutorial step element, as determined by an element having its attributes match a particular criterion/criteria (302), then the Applicant's system retrieves all of the element's attributes (303) and determines relationships between the element and other website elements (305). The element data, including the available HTML attributes of all the elements and the relationships between the element and other website elements, is organized in a data file (e.g., JSON, SQL, etc.) (306) and forwarded to a database of an API server (307). On the other hand, if the element is not a valid tutorial step element, the method warns the user and prompts the user to select a different element (304).

FIG. 4 is a flow diagram illustrating an example embodiment of a method employed by the present disclosure. The method begins when a website user runs a tutorial step through the player (e.g., element 202 of FIG. 2). When the tutorial step is run (401), the player (e.g., element 202 of FIG. 2) determines whether the website page is fully loaded (402). If the page is not loaded, then it waits for the page to load before proceeding (403). If the page is fully loaded, or after the page completes fully loading, the player (e.g., element 202 of FIG. 2) retrieves all of the elements on the webpage that contain a type or "tagName" attribute that is similar to the target element's type attribute (404). Attributes that are similar include the following examples of HTML, elements that are commonly used in place of each other. In the below list, elements that are similar considered similar to each other are contained within the brackets. For example, an "h1" tag is considered similar to an "h2", "h3", "h4", "h5", or "h6" tag, as well as P, Span, and Label tags. As another example, an "a" tag can be considered similar to a "button" tag, as shown in (b)(i) below.

a) const headingTags=['h1', 'h2', 'h3', 'h4', 'h5', 'h6']
    b) const SIMILAR TAGS=
        i. a: ['a', 'button'],
        ii. abbr: ['abbr'],
        iii. address: ['address'],
        iv. area: ['area'],
        v. article: ['article'],
        vi. aside: ['aside'],
        vii. audio: ['audio'],
        viii. b: ['b', 'strong', 'em'],
        ix. base: ['base'],
        x. bdi: ['bdi'],
        xi. bdo: ['bdo'],
        xii. blockquote: ['blockquote'],
        xiii. body: ['body'],
        xiv. br: ['br'],
        xv. button: ['button', 'a'],
        xvi. canvas: ['canvas'],
        xvii. caption: ['caption'],
        xviii. cite: ['cite'],
        xix. code: ['code'],
        xx. col: ['col', 'colgroup'],
        xxi. colgroup: ['colgroup', 'col'],
        xxii. data: ['data'],
        xxiii. datalist: ['datalist'],
        xxiv. dd: ['dd'],
        xxv. del: ['del'],
        xxvi. details: ['details'],
        xxvii. dfn: ['dfn'],
        xxviii. dialog: ['dialog'],
        xxix. div: ['div', 'span'],
        xxx. dl: ['dl', 'dt'],
        xxxi. dt: ['dt', 'dl'],
        xxxii. em: ['em', 'strong'],
        xxxiii. embed: ['embed'],
        xxxiv. fieldset: ['fieldset'],
        xxxv. figure: ['figure'],
        xxxvi. footer: ['footer', 'div', 'span'],
        xxxvii. form: ['form'],
        xxxviii. h1: ['p', . . . headingTags, 'label'],
        xxxix. h2: ['p', . . . headingTags, 'label'],
        xl. h3: ['p', . . . headingTags, 'label'],
        xli. h4: ['p', . . . headingTags, 'label'],
        xlii. h5: ['p', . . . headingTags, 'label'],
        xliii. h6: ['p', . . . headingTags, 'label'],
        xliv. head: ['head'],
        xlv. header: ['header', 'div', 'span'],
        xlvi. hgroup: ['hgroup'],
        xlvii. hr: ['hr'],
        xlviii. html: ['html'],
        xlix. is: ['i', 'em', 'strong'],
        l. iframe: ['iframe'],
        li. img: ['img', 'svg'],
        lii. input: ['input', 'textarea', 'button'],
        liii. ins: ['ins'],
        liv. kbd: ['kbd'],
        lv. keygen: ['keygen'],
        lvi. label: ['label', 'p', . . . headingTags],
        lvii. legend: ['legend'],
        lviii. li: ['li'],
        lix. link: ['link'],
        lx. main: ['main'],
        lxi. map: ['map'],
        lxii. mark: ['mark'],
        lxiii. menu: ['menu'],
        lxiv. menuitem: ['menuitem'],
        lxv. meta: ['meta'],
        lxvi. meter: ['meter'],
        lxvii. nav: ['nay', 'header', 'div', 'span'],
        lxviii. noscript: ['noscript'],
        lxix. object: ['object'],
        lxx. ol: ['ol', 'ul'],
        lxxi. optgroup: ['optgroup'],
        lxxii. option: ['option', 'input', 'li'],
        lxxiii. output: ['output'],
        lxxiv. p: ['p', . . . headingTags, 'label'],
        lxxv. param: ['param'],
        lxxvi. pre: ['pre'],
        lxxvii. progress: ['progress'],
        lxxviii. q: ['q'],
        lxxix. rb: ['rb'],
        lxxx. rp: ['rp'],
        lxxxi. rt: ['rt'],
        lxxxii. rtc: ['rtc'],
        lxxxiii. ruby: ['ruby'],
        lxxxiv. s: ['s'],
        lxxxv. samp: ['samp'],
        lxxxvi. script: ['script'],
        lxxxvii. section: ['section', 'div', 'span'],
        lxxxviii. select: ['select', 'input', 'div'],
        lxxxix. small: ['small', 'em'],
        xc. source: ['source'],
        xci. span: ['div', 'span', 'i', 'b', 'em', 'section'],
        xcii. strong: ['strong', 'b', 'em'],
        xciii. style: ['style'],
        xciv. sub: ['sub'],
        xcv. summary: ['summary'], xcvi. sup: ['sup'],
xcvii. table: ['table'],
xcviii. tbody: ['tbody'],
xcix. td: ['td'],
c. template: ['template'],
ci. textarea: ['input', 'textarea'],
cii. tfoot: ['tfoot'],
ciii. th: ['th'],
civ. thead: ['thead'],
cv. time: ['time'],
cvi. title: ['title'],
cvii. tr: ['tr'],
cviii. track: ['track'],
cix. u: ['u'],
cx. ul: ['ul', 'ol'],
cxi. var: ['var'],
cxii. video: ['video'],
cxiii. wbr: ['wbr'],
c) SVG Tags
  i. svg: ['img', 'svg'],
  ii. g: ['g'],
  iii. path: ['path'],
  iv. line: ['line'],
  v. ellipse: ['ellipse'], If no elements with a similar type attribute are found (405), then the player (e.g., element 202 of FIG. 2) proceeds to retrieve all of the elements on the webpage with a similar class attribute as the target element (407). If no elements having a similar class attribute as the target element are found (408), the player (e.g., element 202 of FIG. 2) proceeds to retrieve all of the elements on the webpage that are determined to be valid tutorial step elements (see, e.g., FIG. 3, 302) (409).

Once the method finds the above described elements at any of these three steps (404, 407, 409), the player (202 e.g., element 202 of FIG. 2) calculates scores for each element (406). The player (e.g., element 202 of FIG. 2) calculates scores for each element by comparing each element attribute to that of the target element and increasing the element's score by the significance weight associated with that attribute if the attributes match (406). An example of calculating significance weight or significance factor weight is, as described above, applying the cluster and k-NN analyses to gathered anonymized data of hundreds or more web platforms to determine significance of each web element.

Once the element scores have been calculated, the player (e.g., element 202 of FIG. 2) determines whether an element has already been selected in a previous iteration of method illustrated by FIG. 4 (411). If an element is already selected, then the method compares highest scoring element's score from the current iteration to the score of the existing selected element and the highest scoring element of the two is selected (412). If no element has been selected yet, the player (e.g., element 202 of FIG. 2) selects the highest scoring element from the current iteration (413). Once an element has been selected, the player (e.g., element 202 of FIG. 2) waits for any changes to occur to the website page (414). Changes to the website page include, but are not limited to, new elements being added to the HTML DOM, elements moving to new locations both visually or within the DOM tree, a user interacting with the site (e.g., clicking, scrolling, zooming, resizing, etc.), or navigating to a new webpage. When any of these such changes occur, the method restarts by retrieving elements on the page with a similar type attribute as the target element (404).

Figure 5:
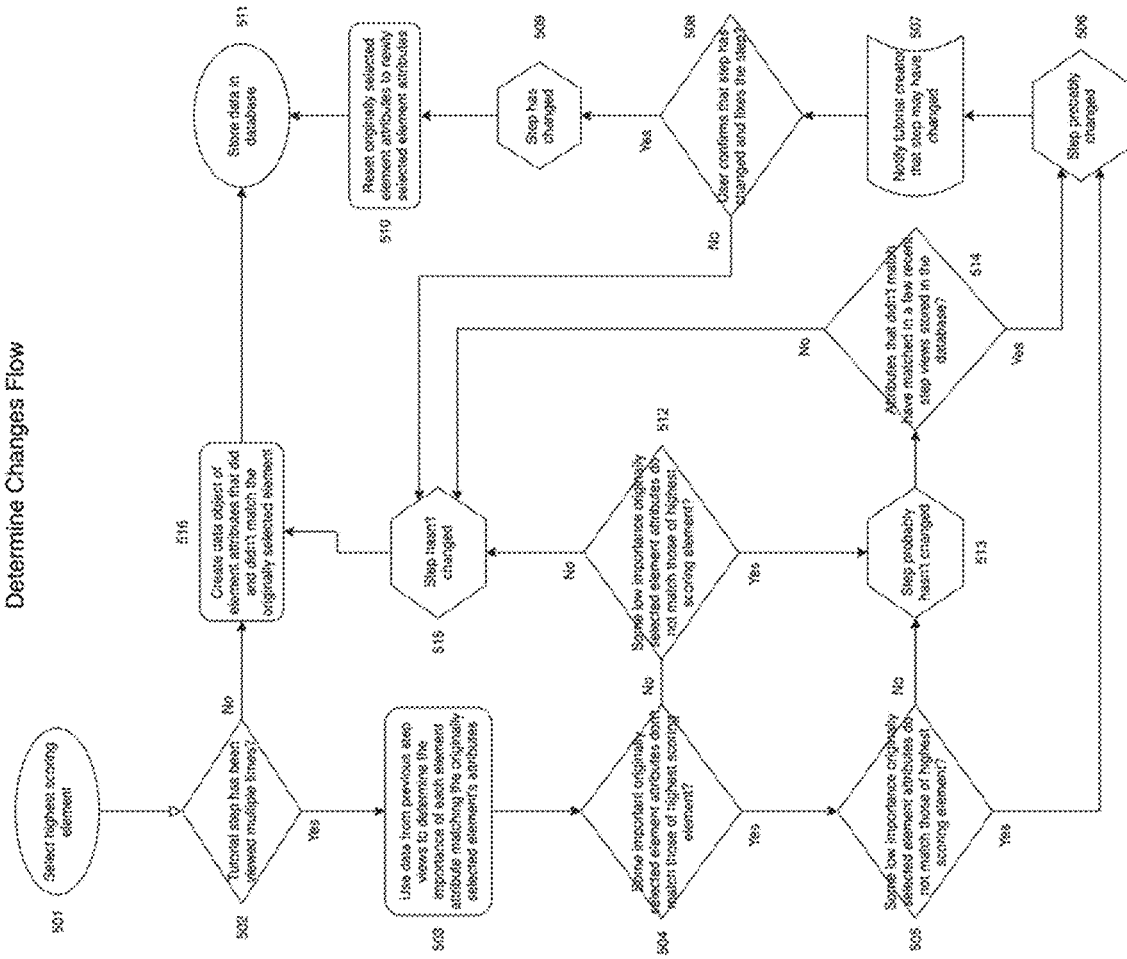
FIG. 5 is a flow diagram illustrating an example embodiment of a method employed by the present disclosure, determining changes to an element.

FIG. 5 is a flow diagram illustrating an example embodiment of a method employed by the present disclosure. The method begins when the player (e.g., element 202 of FIG. 2) selects an element as outlined in the "Find Element Flow" in FIG. 4 (413). After the player (e.g., element 202 of FIG. 2) selects an element (501), the API server (307) checks to see if the tutorial step has been viewed by multiple (e.g., more than 5, although other embodiments could use lower or higher thresholds) other website users (502). If the tutorial step has not been viewed multiple times, then the player (e.g., element 202 of FIG. 2) simply creates a data object of the element attributes that did and did not match the target element (516) and sends that data object to the API Server which proceeds to store it in a database (511).

If the tutorial step has been viewed multiple times (502), then the API Server uses the data objects from those previous tutorial step views to determine the importance of each element attribute matching the target element's attributes (503). Once the element attributes have been ranked by importance, the player (e.g., element 202 of FIG. 2) first determines whether any highly important attributes of the selected element do not match those of the target element (504).

Each attribute's importance metric is calculated by calculating the percentage of times that the attribute has contributed to the highest scoring element being selected (e.g., the attribute in question of the highest scoring element matches that of the original target element) in previous views of the tutorial step in question. This percentage is then compared to the percentages of the other attributes of the element to ultimately group them into buckets of "should match" attributes and "must match" attributes. Consider that the term "attributes" refers to a list of all element attributes on the website, and a is a number of element attributes. For each attribute of the element's attributes, consider that m is the number of times attribute matched target element attribute in tutorial step views, n is the number of times tutorial step was viewed, and r is the ration of m to n (e.g., m/n). Attribution contribution rates t can be calculated as follows:

$$t = \Sigma_{i=0}^{a-1} f(\text{attributes}[i][r])$$

From this value, low thresholds and high thresholds can be calculated. A low, "should match" threshold can be calculated as low threshold $$(\text{"should match"}) = \frac{t}{a} * sm,$$

where sm is a constant that can be adjusted to fine tune the system. Similarly, a high threshold can be calculated as high threshold $$(\text{"must match"}) = \frac{t}{a} * mm,$$

where mm is a constant that can be adjusted to fine tune the system. In an embodiment, sm=0.6 and mm=0.7. However, a person having ordinary skill in the art can recognize that sm and mm can have different values to adjust the sensitivity of the system.

Once these thresholds are calculated, attributes are bucketed into "must match" if their r value is greater than the high threshold, "should match" if their r value is less than the high threshold but greater than the low threshold, and "not important" if their r value is less than the low threshold.

Next, the player (e.g., element 202 of FIG. 2) checks to see if any less important attributes of the selected element don't match those of the target element (505, 512). The difference between decision blocks (505) and (512) are that (505) deals with the situation where important originally selected elements don't match those of the highest scoring element, where (512) deals with the important originally selected elements that do match. The player (e.g., element 202 of FIG. 2) is thus left with four different scenarios.

(1) If there are both highly important and less important attributes that do not match (505), then the player (e.g., element 202 of FIG. 2) determines that the target element has probably changed (506), and notifies the tutorial creator that the step may have changed (507).

(2) If all attributes of the selected element match those of the target element then the player (e.g., element 202 of FIG. 2) determines that the step has not changed (515), creates a data object from the element attributes (516) and sends it to the API Server which stores it in a database.

If there are (3) only highly important attributes that do not match the target element or there are (4) only less important attributes that don't match the target element, then the player (e.g., element 202 of FIG. 2) determines that the step probably hasn't changed (513) and decides to run further analysis. In this scenario, the player (e.g., element 202 of FIG. 2) checks to see if the attributes that didn't match the target element also didn't match the target element in the history of data objects stored in the database (514). If there is a history of these attributes not matching, then the player (e.g., element 202 of FIG. 2) determines that the step has not changed (515), creates a data object from the element attributes (516) and sends it to the API Server which stores it in a database. However, if there is not a history of these attributes not matching then the player (e.g., element 202 of FIG. 2) determines that the target element has probably changed (506) and notifies the tutorial creator that the step may have changed (507). When a tutorial creator is notified (507), they either confirm that the step has changed (509) and manually fix it or indicate that the step hasn't changed (515) (508). If the tutorial creator confirms that the step has changed (509) and manually fixes it then the target element is reset to the newly selected element (510) and the API Server stores it in the database (511). If the tutorial creator indicates that the step has not changed (515) then the player (e.g., element 202 of FIG. 2) creates a data object from the element attributes (516) and sends it to the API Server which stores it in a database. This method is run every time an element is selected by the "Find Element Flow" in FIG. 4

Figure 6:
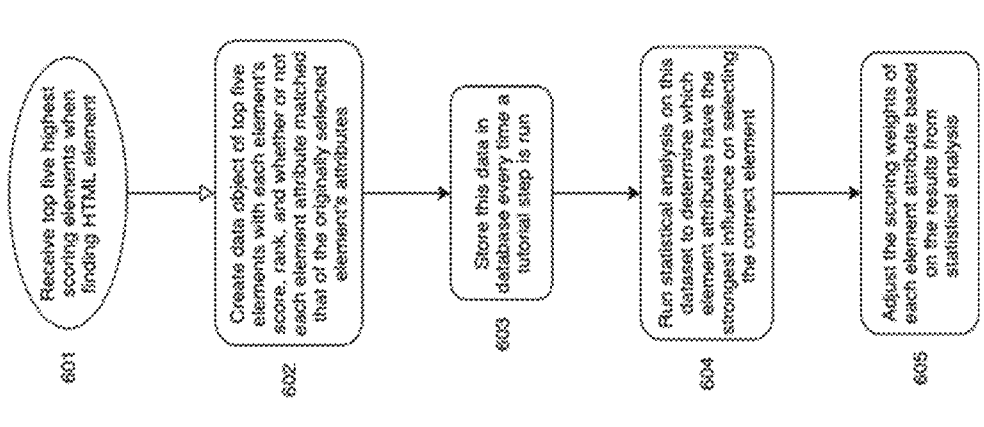
FIG. 6 is a flow diagram illustrating an example embodiment of a method employed by the present disclosure, calculating element attribute probability weights.

FIG. 6 is a flow diagram illustrating an example embodiment of a method for calculating significance factors for each attribute. When the player (e.g., element 202 of FIG. 2) finishes scoring the list of elements in FIG. 4 (406), it sends a data object of the top five highest scoring elements to the API Server (307). When the API Server (307) receives this data object (601), it creates an organized data object with more info about each element (i.e., it's score, rank, and whether or not each element attribute matched the target element's attributes) (602). The API Server proceeds to store this data object in the database each time a tutorial step is run (603). At chosen time or data volume intervals, the API Server runs statistical analysis on this dataset to determine which attributes have the strongest influence on increasing the correct element's score and ranking it highest (604). This statistical analysis can include cluster and k-nn analysis, as described above. This statistical analysis leads to the calculation of a significance weight associated with each element attribute (605) and these new weights are used in future iterations of the "Find Element Flow" FIG. 4. This method can be run on a universal basis (e.g., all websites that data has been collected from), a per website basis, a per tutorial basis, or even a per HTML, element basis to adjust its accuracy (606).

Figure 7:
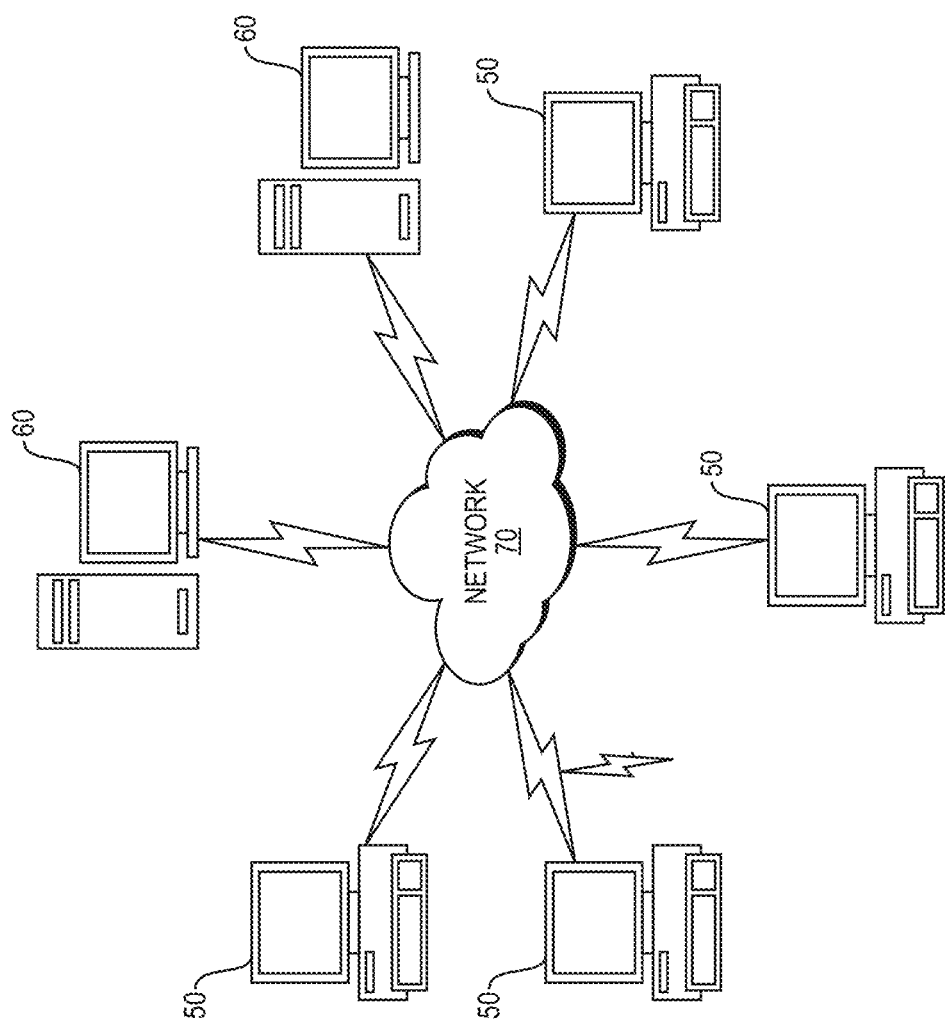
FIG. 7 illustrates a computer network or similar digital processing environment in which embodiments of the present invention may be implemented.

FIG. 7 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 8:
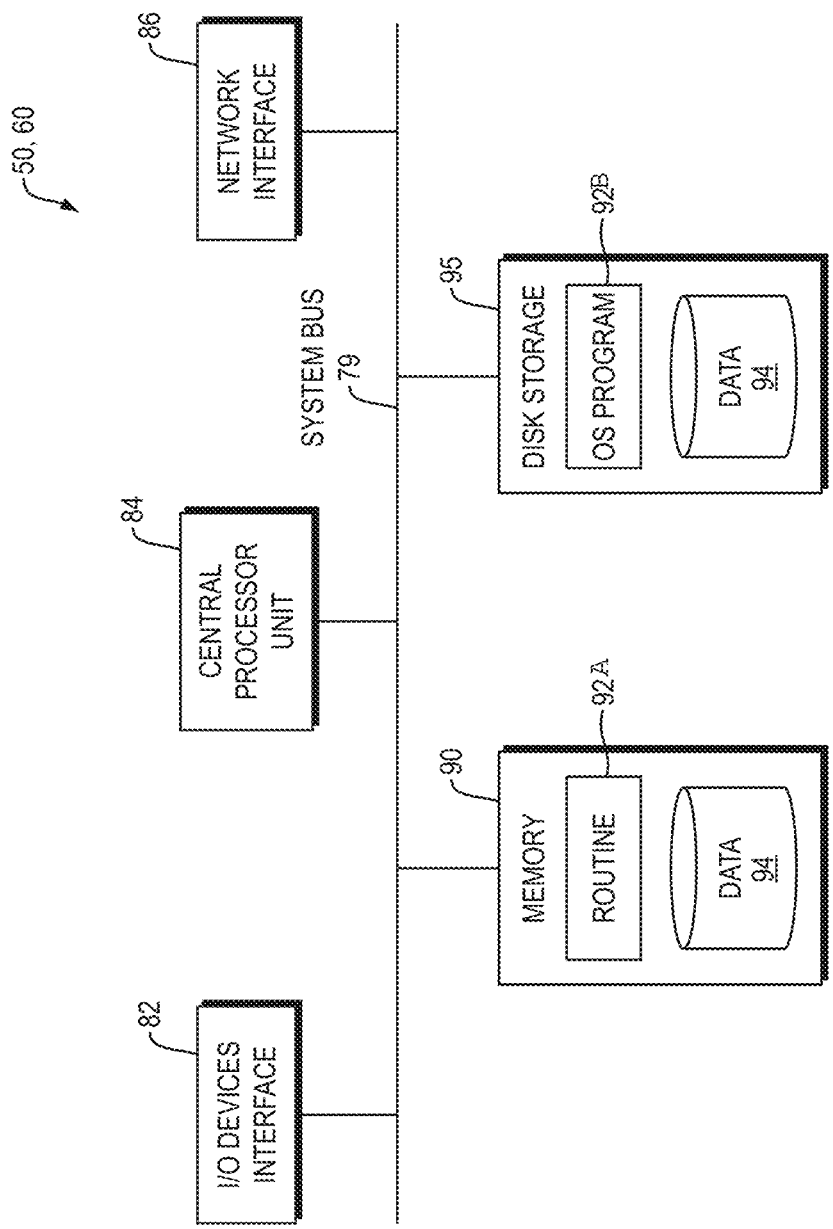
FIG. 8 is a diagram of an example internal structure of a computer (e.g., client processor/device or server computers) in the computer system of FIG. 7.

FIG. 8 is a diagram of an example internal structure of a computer (e.g., client processor/device 50 or server computers 60) in the computer system of FIG. 7. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 7). Memory 90 provides volatile storage for computer software instructions 92 and data 94 used to implement an embodiment of the present invention (e.g., host code, builder code, player code, API server code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method of updating a tutorial of a website for each particular original element of at least one original element added to the tutorial, the method comprising:
retrieving a list of derivative elements from a modified website, the modified website being modified relative to an original website having a tutorial having added at least one original element of the original website to be highlighted to an end-user and storing (a) attributes of the at least one original element and (b) one or more relationships of the at least one original element to other elements of the original website in a database;
generating a similarity metric by comparing stored attributes of the particular original element and the stored one or more relationships of the particular original element to attributes of each of the derivative elements of the modified website and one or more relationships of the derivative elements of the modified website, wherein generating the similarity metric is based on applying adjustable scoring weights of element attributes to each comparison,
selecting a derivative element of the list of derivative elements having a highest similarity metric as matching the particular original element of the tutorial; and
updating the tutorial by mapping the derivative element having the highest similarity metric to the particular original element of the tutorial.

2. The computer-implemented method of claim 1, further comprising:
warning the end-user upon determining that the at least one original element of the website is invalid for inclusion in a tutorial.

3. The computer-implemented method of claim 1, wherein selecting the derivative element having the highest similarity metric as matching the particular original element of the tutorial further includes:
upon determining at least one derivative element of the modified website has a similar type attribute to the at least original one element of the website, scoring each of the at least one derivative elements with the similar type attribute by comparing the attributes of the at least one original element of the website to the at least one derivative element of the modified website.

4. The computer-implemented method of claim 3, further comprising:
upon determining a derivative element is not selected or is selected but a higher scoring derivative element has been found, selecting a highest scoring derivative element and wait for changes to the website; and
upon determining a derivative element is selected and the highest scoring derivative element does not have a higher score than the currently selected element, waiting for website changes.

5. The computer-implemented method of claim 1, further comprising:
when a derivative element with a similar type attribute is not found, determining whether any original elements of the website have the same class attributes as derivative elements of the modified website;
scoring each of the at least one derivative elements determined to have the same class with the same class attribute by comparing the original attributes of the at least one element of the website to the at least one derivative element of the modified website; and
selecting all derivative elements determined to not have the same class that are valid tutorial elements, and scoring each of the at least one elements that are valid tutorial elements by comparing the original attributes of the at least one element of the website to the at least one derivative element of the modified website.

6. The computer-implemented method of claim 1, further comprising:
for elements viewed multiple times, determining an importance metric for each original element attribute of the at least one original element of the website;
creating a data object of the corresponding derivative element attributes matching and not matching the at least one original element of the website for all original element attributes having an importance metric above a low threshold match the corresponding derivative element attributes;
marking the step as having a high likelihood of having been changed for original element attributes having an importance metric above a high threshold do not match the corresponding derivative element attributes, or for original element attributes having an importance metric below a high threshold and above a low threshold do not match the corresponding derivative element attributes determining whether non-matching attributes have matched in other recent step views stored in a database, and for all other original element attributes, creating a data object of element derivative attributes matching and not matching the at least one original element of the website; and
determining that the step is likely unchanged for original element attributes having an importance metric that are below the low threshold do not match the corresponding derivative element attributes.

7. The computer-implemented method of claim 1, further comprising:
creating a data object for each of a set of highest scoring derivative elements having a score, rank, and a Boolean match value within each respective data object;
storing the data object in a database each time a tutorial step is executed;
analyzing the data object to determine element attributes having a strongest influence on selecting a correct element; and
adjusting scoring weights of each element attribute based on said analysis.

8. A system comprising:
a processor; and
a memory with computer code instructions stored thereon, the processor and the memory, with the computer code instructions, being configured to cause the system to:
build a tutorial for an end-user of a website by selecting and adding, to the tutorial, at least one original element of the website to be highlighted to the end-user and storing (a) attributes of the at least one original element and (b) one or more relationships of the at least one original element to other elements of the website in a database;
retrieve a list of derivative elements from a modified website;
update the tutorial of the website for each particular element of the at least one original element added to the tutorial by:
generate a similarity metric by comparing the stored attributes of the particular original element and the stored one or more relationships of the particular original element to attributes of each of the derivative elements of the modified website and one or more relationships of the derivative elements of the modified website, wherein generation of the similarity metric is based on applying adjustable scoring weights of element attributes to each comparison,
select a derivative element of the list of derivative elements having a highest similarity metric as matching the particular original element of the tutorial; and
update the tutorial by mapping the derivative element having the highest similarity metric to the particular original element of the tutorial.

9. The system of claim 8, wherein building the tutorial further includes warning the end-user upon determining that the at least one element of the website is invalid for inclusion in a tutorial.

10. The system of claim 8, wherein selecting the derivative element having the highest similarity metric as matching the particular original element of the tutorial further includes:
upon determining at least one derivative element of the modified website has a similar type attribute to the at least original one element of the website, scoring each of the at least one derivative elements with the similar type attribute by comparing the attributes of the at least one original element of the website to the at least one derivative element of the modified website.

11. The system of claim 10, wherein the instructions are further configured to cause the processor to:
upon determining a derivative element is not selected or is selected but a higher scoring derivative element has been found, select a highest scoring derivative element and wait for changes to the website; and
upon determining a derivative element is selected and the highest scoring derivative element does not have a higher score than the currently selected element, wait for website changes.

12. The system of claim 8, wherein the instructions are further configured to cause the processor to:
when a derivative element with a similar type attribute is not found, determine whether any original elements of the website have the same class attributes as derivative elements of the modified website;
score each of the at least one derivative elements determined to have the same class with the same class attribute by comparing the original attributes of the at least one element of the website to the at least one derivative element of the modified website; and
select all derivative elements determined to not have the same class that are valid tutorial elements, and score each of the at least one elements that are valid tutorial elements by comparing the original attributes of the at least one element of the website to the at least one derivative element of the modified website.

13. The system of claim 8, wherein the instructions are further configured to cause the processor to:
for elements viewed multiple times, determine an importance metric for each original element attribute of the at least one original element of the website;
create a data object of the corresponding derivative element attributes matching and not matching the at least one original element of the website, all original element attributes having an importance metric above a low threshold match the corresponding derivative element attributes;
mark the step as having a high likelihood of having been changed for original element attributes having an importance metric above a high threshold do not match the corresponding derivative element attributes, or for original element attributes having an importance metric below a high threshold and above a low threshold do not match the corresponding derivative element attributes determining whether non-matching attributes have matched in other recent step views stored in a database, and otherwise, creating a data object of element derivative attributes matching and not matching the at least one original element of the website; and
determine that the step is likely unchanged for original element attributes having an importance metric that are below the low threshold do not match the corresponding derivative element attributes.

14. The system of claim 8, wherein the instructions are further configured to cause the processor to:
create a data object for each of a set of highest scoring modified elements having a score, rank, and a Boolean match value within each respective data object;
store the data object in a database each time a tutorial step is executed;
analyze the data object to determine element attributes having a strongest influence on selecting a correct element; and
adjust scoring weights of each element attribute based on said analysis.

15. A computer-implemented method comprising:
updating a tutorial of an original website for each particular original element of the original website added to the tutorial by:
generating a similarity metric by comparing attributes of the particular element of the original website and one or more relationships of the particular original element of the original website to attributes of each derivative element of a modified website and one or more relationships of derivative elements of the modified website, wherein generation of the similarity metric is based on applying adjustable scoring weights of element attributes to each comparison,
selecting a derivative element having a highest similarity metric as matching the particular original element of the tutorial; and
updating the tutorial by mapping the derivative element having the highest similarity metric to the particular original element of the tutorial.

16. The computer-implemented method of claim 15, wherein selecting the derivative element having the highest similarity metric as matching the particular original element of the tutorial further includes:
upon determining at least one derivative element of the modified website has a similar type attribute to the at least original one element of the website, scoring each of the at least one derivative elements with the similar type attribute by comparing the attributes of the at least one original element of the website to the at least one derivative element of the modified website.

17. The computer-implemented method of claim 16, further comprising:
upon determining a derivative element is not selected or is selected but a higher scoring derivative element has been found, selecting a highest scoring derivative element and wait for changes to the website; and upon determining a derivative element is selected and the highest scoring derivative element does not have a higher score than the currently selected element, waiting for website changes.

18. The computer-implemented method of claim 15, further comprising:
    when a derivative element with a similar type attribute is not found, determining whether any original elements of the website have the same class attributes as derivative elements of the modified website;
    scoring each of the at least one derivative elements determined to have the same class with the same class attribute by comparing the original attributes of the at least one element of the website to the at least one derivative element of the modified website; and
    selecting all derivative elements determined to not have the same class that are valid tutorial elements, and scoring each of the at least one elements that are valid tutorial elements by comparing the original attributes of the at least one element of the website to the at least one derivative element of the modified website.

19. The computer-implemented method of claim 15, further comprising:
    for elements viewed multiple times, determining an importance metric for each original element attribute of the at least one original element of the website;
    creating a data object of the corresponding derivative element attributes matching and not matching the at least one original element of the website for all original element attributes having an importance metric above a low threshold match the corresponding derivative element attributes;
    marking the step as having a high likelihood of having been changed for original element attributes having an importance metric above a high threshold do not match the corresponding derivative element attributes, or for original element attributes having an importance metric below a high threshold and above a low threshold do not match the corresponding derivative element attributes determining whether non-matching attributes have matched in other recent step views stored in a database, and for all other original element attributes, creating a data object of element derivative attributes matching and not matching the at least one original element of the website; and
    determining that the step is likely unchanged for original element attributes having an importance metric that are below the low threshold do not match the corresponding derivative element attributes.

20. The computer-implemented method of claim 15, further comprising:
    creating a data object for each of a set of highest scoring derivative elements having a score, rank, and a Boolean match value within each respective data object;
    storing the data object in a database each time a tutorial step is executed;
    analyzing the data object to determine element attributes having a strongest influence on selecting a correct element; and
    adjusting scoring weights of each element attribute based on said analysis.

* * * * *